UNITED STATES PATENT OFFICE.

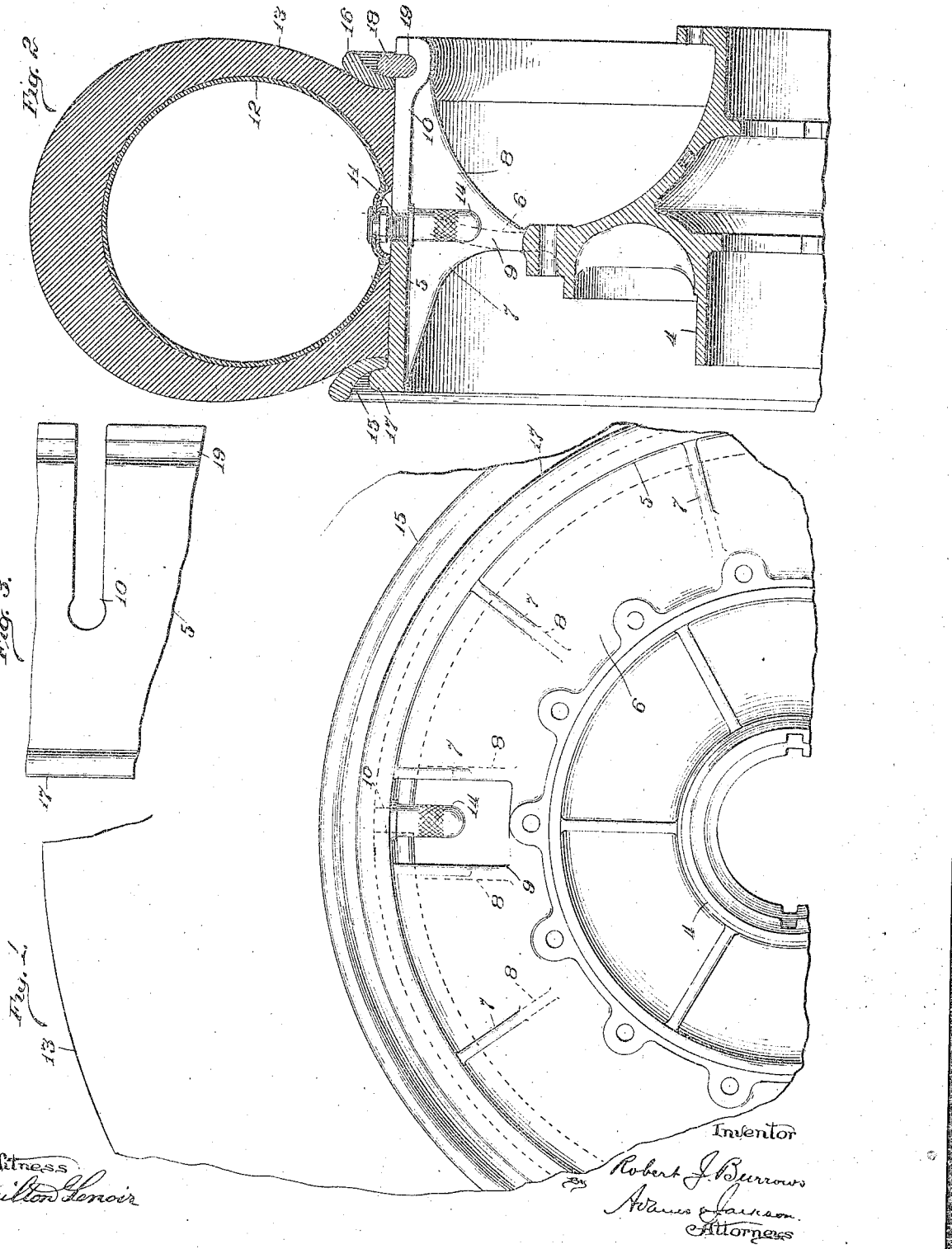

ROBERT J. BURROWS, OF BUCHANAN, MICHIGAN, ASSIGNOR TO CLARK EQUIPMENT COMPANY, OF BUCHANAN, MICHIGAN, A CORPORATION OF MICHIGAN.

METAL WHEEL.

1,416,330.   Specification of Letters Patent.   Patented May 16, 1922.

Application filed July 12, 1919. Serial No. 310,423.

*To all whom it may concern:*

Be it known that I, ROBERT J. BURROWS, a citizen of the United States, and a resident of Buchanan, in the county of Berrien and State of Michigan, have invented certain new and useful Improvements in Metal Wheels, of which the following is a specification, reference being had to the accompanying drawings.

My invention relates to pneumatic tired wheels for vehicles, and is peculiarly applicable to metal wheels and especially those designed for heavy vehicles such as motor trucks, the tires of which are necessarily very heavy and difficult to apply and remove from the wheel. It has for its object to provide an improved construction by which pneumatic tires, even of the heaviest type, may readily be applied to or removed from the wheel without objectionable cramping of the tire or turning it at a sharp angle to the rim or felly band of the wheel, and also to improve the construction of metal wheels of this type in other respects hereinafter pointed out. I accomplish this object as illustrated in the drawings and as hereinafter described. What I regard as new is set forth in the claims.

In the accompanying drawings,—

Fig. 1 is a side elevation of part of a wheel embodying my invention;

Fig. 2 is a partial cross sectional view; and

Fig. 3 is a detail illustrating part of the rim.

In the illustrated embodiment of my invention, 4 indicates the hub of the wheel which may be of any suitable design, and 5 indicates the rim which is connected to the hub by an integral web 6, preferably in the form of a disc, the inner portion of which joins the hub 4 near the longitudinal center thereof, as shown in Fig. 2. The outer portion of said web is provided with laterally-extending ribs 7—8 at opposite sides thereof, which join with the felly band or rim 5 adjacent to the margins thereof to brace the same. These ribs are provided at intervals around the wheel, as shown in Fig. 1. The hub 4, rim 5, and web 6, together with the ribs 7—8, are all cast integral.

9 indicates an opening in the outer portion of the web 6 between two of the pairs of ribs 7—8, which opening registers with the inner end portion of a transverse slot 10 provided in the rim 5. This slot is of suitable width to permit of the passage of the valve stem 11 of a pneumatic tube 12, as shown in Figs. 2 and 3, so that a pneumatic tire casing 13 containing the tube 12 may be slipped upon the rim 5 by bringing the valve stem 11 into position to move inwardly in said slot. It will be noted that two of the ribs 8 are provided at the opposite margins of the opening 9, which ribs are also adjacent to the margins of the transverse slot 10, as best shown in Figures 1 and 2, so that they effectively reinforce the felly band at opposite sides of said slot and compensate for the weakening of the rim incident to the cutting away of material to form the slot. By this construction the necessity of cramping the tire or turning it at a pronounced angle to the felly band when applying or removing the tire, due to the presence of the valve stem, is avoided, and the work of applying or removing the tire is greatly facilitated. When the tire is in position on the rim the valve stem 11 projects into the opening 9 so that it is readily accessible from either side of the wheel to permit the tire to be pumped up or deflated, as desired. 14 indicates the usual valve stem cap which may be applied to the valve stem 11, as shown in Figs. 1 and 2. In the construction illustrated, I have shown the tire as being held in place by retaining ring plates 15—16, the ring plate 15 being adapted to abut against a marginal flange 17 provided at the inner margin of the rim 5, while the ring plate 16 is held in place by a split locking ring 18 fitted in a groove 19 at or near the opposite margin of the rim 5. Any other suitable tire-securing devices may, however, be employed, and it will be understood further that instead of applying the tire directly to the rim 5, it may be carried by a demountable rim in accordance with well understood practice.

So far as I am aware, no one has heretofore proposed to provide the felly band of a wheel with a transverse slot to receive the valve stem of a pneumatic tire, in connection with reinforcing means between the felly band and the body of the wheel at opposite sides of and adjacent to the slot, and the claims hereinafter made are therefore not to be restricted to the specific construction shown and described, but, except in so far as the same is particularly claimed, should be construed generically.

What I claim as my invention and desire to secure by Letters Patent, is—

1. A wheel comprising a hub, a felly band having a transverse slot to receive the valve stem of a pneumatic tire, means connecting the felly band with the hub, and reinforcing means extending transversely between said connecting means and the felly band adjacent to said slot.

2. A metal wheel comprising a hub, a felly band having a transverse slot to receive the valve stem of a pneumatic tire, means integral with said felly band for connecting the same with the hub, and integral reinforcing means extending transversely between said connecting means and the felly band adjacent to said slot.

3. A metal wheel comprising a hub, a felly band and an intermediate integral disc, there being formed in said felly band a transverse slot, and integral reinforcing webs extending transversely between said disc and felly band adjacent to said slot.

4. A metal wheel comprising a hub, a felly band and an intermediate integral disc, there being formed in said felly band a transverse slot, and integral reinforcing webs extending transversely between said disc and felly band adjacent to said slot, said disc having an opening registering with the inner portion of said slot.

ROBERT J. BURROWS.